Feb. 23, 1971   O. G. ARTAR   3,565,637

PROCESS FOR FORMING A HEAT STABLE SAUSAGE EMULSION

Filed March 7, 1968   3 Sheets-Sheet 1

INVENTORS:
ORHAN G. ARTAR
MILLARD J. HAFSTAD

BY: *Carl C. Batz*
ATT'Y

INVENTORS:
ORHAN G. ARTAR
WILLARD J. HAFSTAD

INVENTORS:
ORHAN G. ARTAR
MILLARD J. HAFSTAD
BY: *Carl C. Batz*
ATT'Y

United States Patent Office 3,565,637
Patented Feb. 23, 1971

3,565,637
PROCESS FOR FORMING A HEAT STABLE
SAUSAGE EMULSION
Orhan G. Artar, Evanston, Ill., and Millard J. Hafstad,
Detroit Lakes, Minn., assignors to Armour and Company, Chicago, Ill., a corporation of Delaware
Filed Mar. 7, 1968, Ser. No. 711,439
Int. Cl. A22c 11/00; B02c 18/00
U.S. Cl. 99—109
3 Claims

ABSTRACT OF THE DISCLOSURE

An emulsification process for the forming of a heat-stable sausage emulsion employs first an abrading and cutting operation on a slurry of meat protein, fat, water and salt, and after salt-soluble protein has been effectively extracted, the slurry mixture is subjected to a cutting and dispersing action without abrasion to bring the fat into discontinuous phase so that it may be effectively coated with the salt-soluble protein. In the foregoing operation, binder protein in meat is exposed by the abrading or rupturing of the membrane covering the binder protein for the effective and speedy use of the salt in extracting binder protein, but during the abrasive and cutting step, the fat is pressed into film or smear form, thus placing it substantially in continuous phase, and the following step of cutting and dispersing without abrasion is effective in distributing the fat in fine particle form so that it is readily coated with the binder protein.

BACKGROUND AND SUMMARY

Binder protein, which primarily consists of protein called myosin, in red, lean meat is contained in a subunit of muscle called a muscle fiber. The muscle fiber has a protective membrane which ordinarily prevents the salt from effectively reaching the binder protein and thus extracting or solubilizing all of the available binder protein. Even when the meat is finely cut by hand or by a machine such as a chopper or a Mincemaster, the membranes still block access to some binder protein. However, by employing a pressing or abrading force along with the cutting action, we find that the membranes can be ruptured to provide ready access of the salt to the binder protein. This action also results in pressing the fat into smear form. In this form, the fat is substantially in continuous phase and the mixture does not constitute a sufficiently stable emulsion because the binder protein cannot coat effectively such fat material.

We have discovered that the mixture or slurry can be changed into a stable emulsion by cutting and dispersing it, without abrasion, to distribute the fat in small particles and in a discontinuous phase throughout the body so that the binder protein can readily coat the particles.

DRAWINGS

Figure 1:
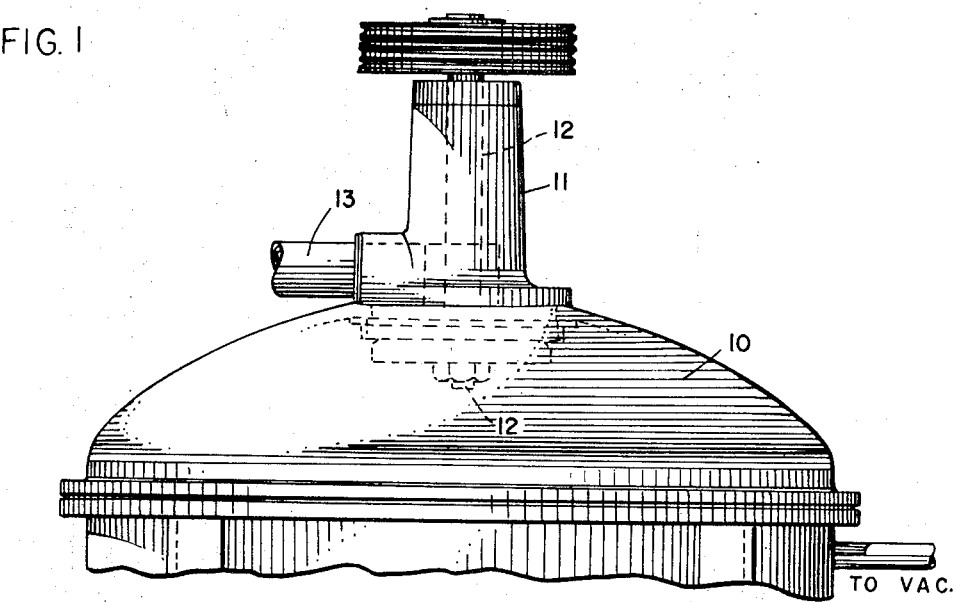
Figure 2:
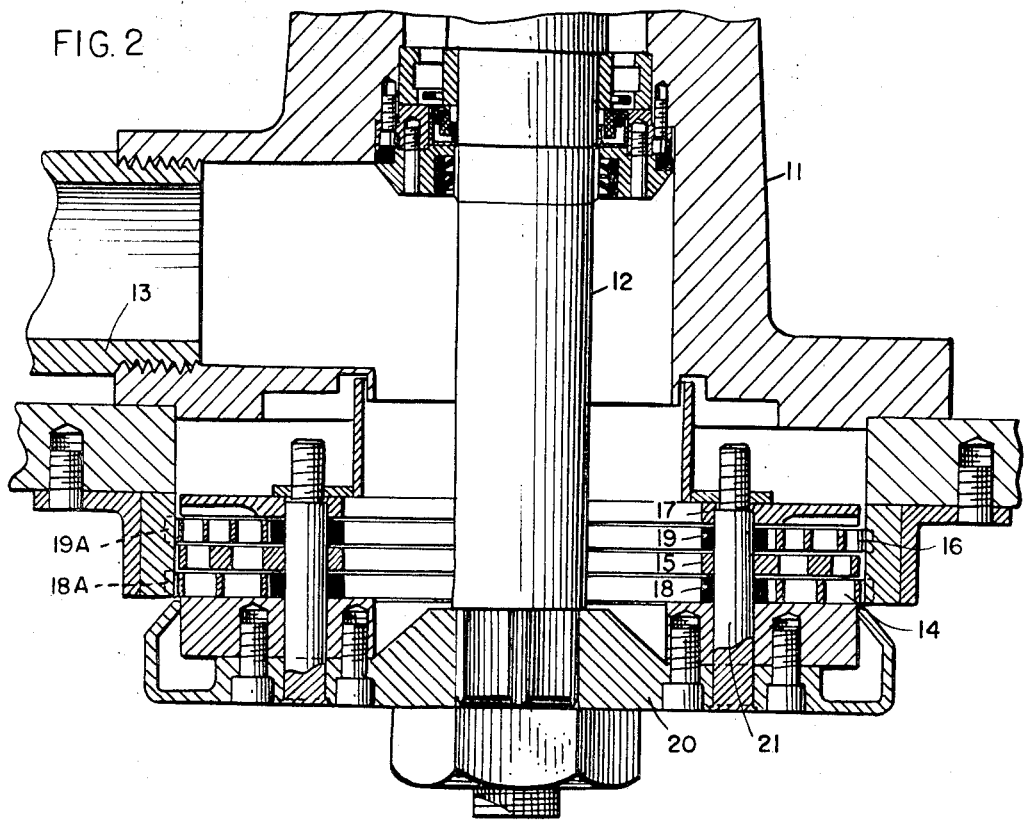
Figure 3:
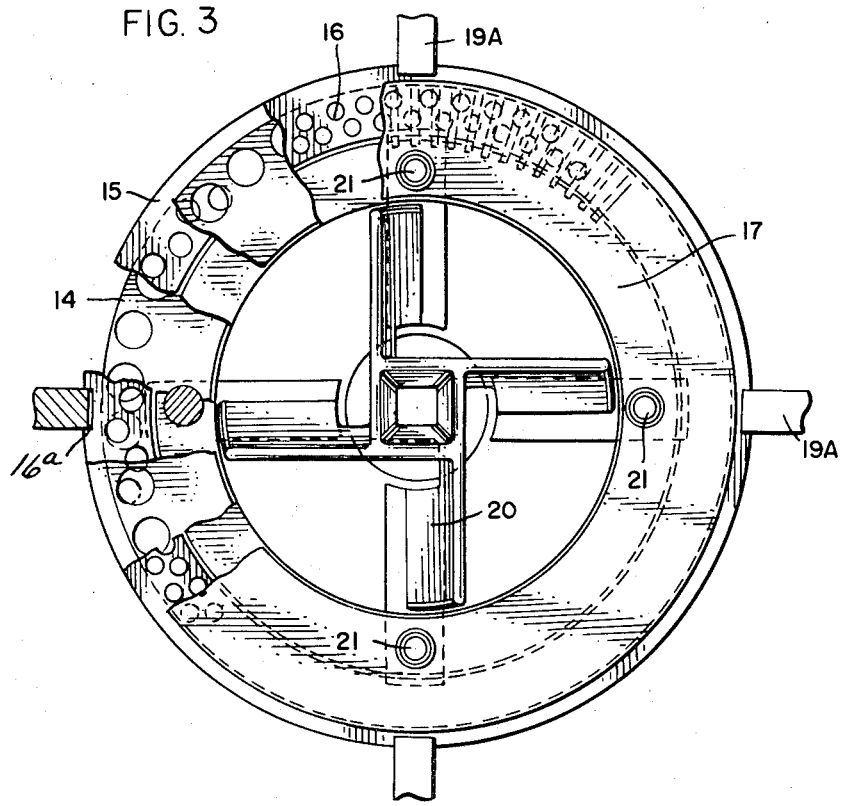
Figure 4:
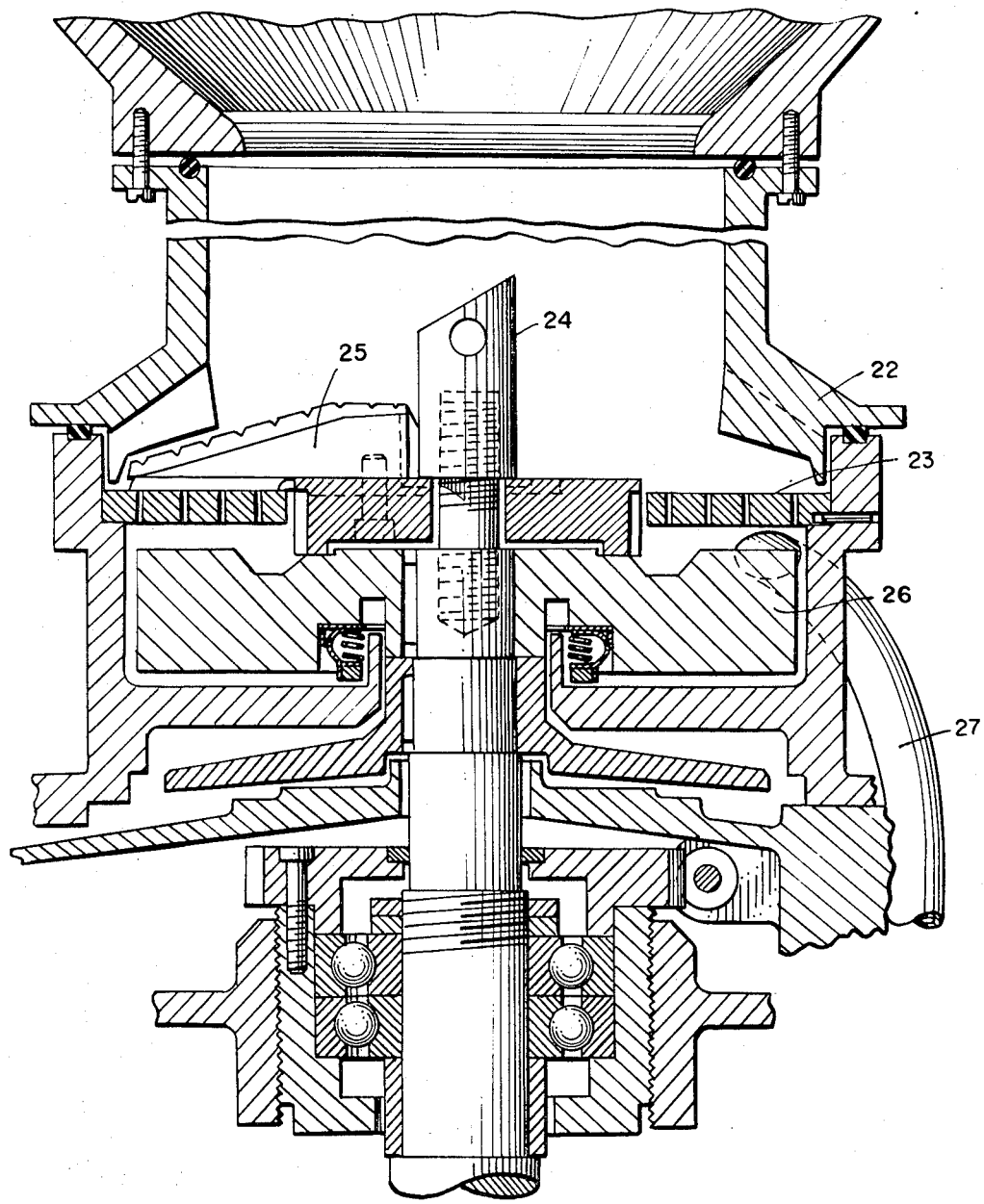

In the accompanying drawings, FIG. 1 is a broken side elevation of a commercial machine known in the trade as the "Comvac machine," FIG. 2, an enlarged sectional view of the cutting heat shown in FIG. 1; FIG. 3, a broken plan view of the plate assembly structure shown in the lower portion of FIG. 2; FIG. 4, a broken vertical sectional view of a commercial machine which is known in the trade by the name "Mincemaster"; and FIG. 5, a broken detail sectional view of the knife and perforated plate structure shown in FIG. 4 showing the knife edge in shearing position and in contact with the top of the perforated plate.

DETAILED DESCRIPTION

In FIGS. 1, 2 and 3, which purport to show the commercial machine known as the "Comvac machine," a casing 10 provides a chamber for receiving the slurry or material which is to be treated. Above the chamber is supported a bearing 11 in which is mounted a driven shaft 12. The slurry or other material to be introduced into the chamber is passed through conduit 13 and onto a cutting head which is made up of a number of plates. In the cutting head, the lowermost plate 14 is a stationary plate and is provided with perforations. Above the plate 14 is a driven plate 15 which is also provided with cutting perforations. Above the plate 15 is a stationary plate 16 provided also with perforations. Finally, above fixed plate 16 is a driven discharge plate 17. A spacer ring 18 is interposed between a bottom plate 20 fixed upon the end of shaft 12 and the driven plate 15, as shown best in FIG. 2, and a spacer ring 19 is interposed between the driven plate 15 and the discharge plate 17. The spacer rings 18 and 19 provide clearances between the plates and the clearances are important in that an abrading action in addition to a cutting action results when the slurry material is passed through the plates. The driven plates 15 and 17 are driven through the bottom plate 20 fixed upon shaft 12 and through driving pins 21 which extend through the plate 20 and through plates 15 and 17, as shown in FIG. 2.

The fixed plate 16 is provided about its periphery with inwardly-extending notches 16a and projections 19a from the casing 10 extend into the notches and hold the plate against rotation, as shown best in FIGS. 2 and 3. Similarly, projections 18a engage like notches in plate 14 and anchor it against rotating. Plates 14 and 16 are cut away along their inner edges so that they do not contact the driving pins 21. In this cut-away area the pins carry the spacers 18 and 19 which are higher than the plates 14 and 16 and thus provide a space between the stationary plate 14 and driven plate 15 and the stationary plate 16 and driven member or plate 17. It is this slight spacing which brings about the squeezing or abrading action above described and which, in addition to the cutting action afforded by the slots in the plates, ruptures the membranes.

Since the structure shown in FIGS. 1–3 is well known, a further detailed description is believed unnecessary.

The slurry passes through conduit 13 and thence downwardly centrally of the cutting head and upwardly through the perforated plates and outwardly from the discharge plate 17. The apparatus is unusually effective by reason of the clearances between the plates in exerting an abrading as well as the cutting action on the slurry material as it passes through the head.

In the structure shown in FIG. 4, the casing 22 provides a chamber through which the slurry of material is passed over a fixed perforated plate 23 above ejector member 26. A driven shaft 24 carries a rotating knife 25 having its edge which contacts the plate so as to cut the material through the plate without any abrading action. The ejector member 26 mounted on the rotating shaft 24 receives the material passing through the perforated plate 23 and discharges the material through conduit 27.

Figure 5:
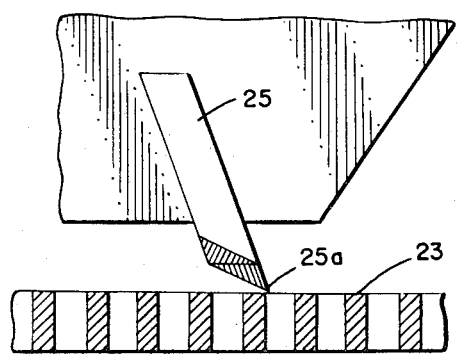

As shown best in FIG. 5, the knife 25 has its cutting edge 25a bearing against the surface of the fixed perforated plate 23 so as to cut without squeezing or smearing the material fed to plate 23, and after the sheared material passes through the plate 23 it is quickly carried away through outlet 27. Since the machine is well known in the industry, a further detailed description is believed unnecessary.

The slurry mixture may be prepared in any suitable manner, as by mixing meat protein, fat, water and salt, together with the usual spices and cure. The mixture may be chopped or comminuted in any suitable or conventional manner, or, if desired, the process may be started with meat already ground which is mixed with salt, water and spices.

The lean meat, from which the desired binder protein is to be extracted, presents a problem in that the muscle and particularly the muscle fibers are enclosed by protective membranes which restrict access of the salt to the binder protein. By passing the mixture through an abrading as well as cutting mechanism, it is found that the membranes are ruptured and this allows quick action of the salt upon the binder protein. Vacuum may also be employed to increase the density of the material. The abrasive action has also an effect upon the fat, pressing the fat into continuous phase so that it has a film or smear form. An advantage has been achieved in that binder protein has been efficiently extracted and is available, but there is a disadvantage in that the fat is substantially distributed in continuous form.

By subjecting the slurry or mixture to a cutting and dispersing action while avoiding abrasion, the fat is changed from the smear configuration to fine particles, while at the same time the mixture is rotated or moved to intimately mix the fine particles of fat with the binder protein so that effective coating of the particles by the protein is brought about. When the emulsion thus produced is subjeced to heating tests to determine its stability, it is found that the emulsion is highly stable, releasing a minimum of fat in the cooking operation.

While the initial emulsion mixture can be formed in any suitable way, we prefer to mix the red or lean muscle meat, fat, water, salt and spices and we obtain a temperature of about 38–52° F. (preferably about 40–50° F.). The mixture may be chopped or comminuted in the presence of water, ice or, if a faster operation is desired, in the presence of warm or hot water. The best results have been obtained when the temperatures are about 44–48° F. The mixture is then subjected to a cutting and abrading action, and for this purpose any suitable apparatus may be used. The ancient flour-making process, in which grinding stones bear upon grain which is to be pulverized by rotating the stones, may be employed, but we prefer to employ modern apparatus in which spaced plates having orifices through the plates providing cutting edges are used so that abrasion and cutting are accomplished in one operation as shown in FIG. 1. Such an operation is shown in U.S. Pat. No. 3,221,788 and is described as a comminutor-vacuumizer unit. Rotating plates which have a slight clearance between the plates provide an abrasive effect upon the muscle particles as the plates rotate, while at the same time holes through the plates provide cutting edges for comminuting the meat material. It will be understood that the rupturing of the membranes and the cutting of the meat body can be accomplished manually, but we prefer to employ known apparatus of the foregoing type for rupturing the membranes of the muscle and exposing the binder protein to the action of the salt.

The abrading and cutting operation may be carried out at any suitable temperature. We prefer, however, to carry through the operation with a mixture having a temperature in the range of about 38–56° F. During the abrading and cutting operation, it is found that the temperature rises usually about 5–15° F.

In the final operation in which the mixture is treated to distribute the fat in discontinuous phase, we may employ any suitable means or apparatus. The mixture may be cut and mixed with cutting tools so as to break up and disperse the fat smears into particles and without abrasive action. We find that this action can be carried out effectively by well-known apparatus, such as the Mincemaster as shown in FIG. 2. This known device consists of fixed plate apparatus in which rotating knives are held against the plate so as to cut the material passing through openings in the plate and without any abrading action. Since the Mincemaster is well known, a further detailed description herein is believed unnecessary. It will be understood that any apparatus, such as a perforated plate through which the slurry is passed while bringing knives across the plate in contact with the plate for the severing action, may be used.

The final cutting and dispersing action, without abrasion, may be carried on at any suitable temperature, but we find that a starting temperature of about 52–66° F. gives the best results.

In the final operation, fat is distributed in fine particles that are surrounded by efficiently solubilized binder protein which forms an effective barrier around the said fat particles so that a surprisingly small amount of the fat is released later in the heat-testing procedure. We believe that this is accomplished by the movement of the material in the Mincemaster or other apparatus when the material is being passed through the fine openings and severed as above described.

The stable emulsion prepared as described above may be employed in preparing finely-comminuted sausage products, such as, for example, bologna, frankfurters, braunschweiger, and other types of liver sausage, pickle loaf, olive loaf, etc.

The combination of steps in which the comminutor-vacuumizer unit, such as that described in Pat. No. 3,221,788 and known commercially as Comvac, followed by pasing the material through a Mincemaster, enables us to use meat mixtures of high fat content by weight, as, for example, the following:

|  | Percentage | | |
| --- | --- | --- | --- |
|  | Meat | Emulsion | Product |
| Meat protein | 10–13 | 7.1–9.4 | 8.5–10.5 |
| Fat | 40–50 | 28.6–35.7 | 32.0–40.0 |
| Water | 40–50 | 53–57 | 44–52 |
| Salt, flavorings, etc | 8–4 | 5 | 6 |

By way of specific example, the product composition may be 10 percent protein, 35 percent fat, 50 percent water, and 5 percent salt, flavorings, etc.

In the abrading and cutting operation carried on by the comminutor-vacuumizer unit, the mixture may be subjected to vacuum for the removal of trapped air and to increase the density of the mixture.

Specific examples illustrative of the process may be set out as follows:

Example I

Meat formula for this test consisted of the following:

|  | Lbs. |
| --- | --- |
| Cow meat—frozen | 100 |
| Boneless beef plates—frozen | 150 |
| Beef hearts—frozen | 100 |
| Pork jowls—fresh | 150 |
|  | 500 |

Other ingredients consisted of all meat bologna flavorings, salt, cure, sodium erythorbate and water.

Emulsion preparation procedure was as follows:

All formula ingredients were mixed together and placed in a chopper. Temperature of the mix at this time was 38° F. Following a 1½ minute chop, the mix was unloaded at a temperature of 50° F. and passed through the comminutor-vacuumizer unit (Comvac). The mix was unloaded from this unit and passed through a Mincemaster. Temperature of the mix from the comminutor-vacuumizer was 62° F. Temperature of finished emulsion from the Mincemaster was 68° F.

The finished emulsion was then stuffed and processed in the conventional manner.

Separate samples of the mix from the chopper and comminutor-vacuumizer and finished emulsion sample from the Mincemaster were subjected to an emulsion stability test.

The emulsion stability test consists of a determination of the amount of fat released from an emulsion mix upon heating under controlled conditions in a test tube. Fat in the amount of .3 ml. or less indicates that the emulsion will process satisfactorily, meaning that fat is emulsified to a great extent and that there will be little or no free fat in the product. As the amount of fat released in the test tube increases, the amount of free fat in the product will increase, resulting in poor quality or unsalable product, depending on the quantity of fat released.

The results of the stability tests were as follows:

| Sample from— | Amount of fat released, ml. |
|---|---|
| Chopper (1) | 6.3 |
| Comvac (1) | .7 |
| Comvac (2) | .8 |
| Mincemaster (1) | .2 |
| Mincemaster (2) | .3 |

Fat content of the finished product was 35.5 percent.

Example II

A weak formula was used for this test, which was as follows:

| | Lbs. |
|---|---|
| Boneless beef plates—frozen | 400 |
| Frozen beef hearts—hard chilled | 100 |
| | 500 |

Other ingredients consisted of all meat bologna flavorings, salt, cure, sodium erythorbate and water.

Emulsion preparation procedure was as follows:

All formula ingredients were mixed together and placed in a chopper. Temperature of the mix at this time was 32° F. Following a 1½ minute chop, the mix was unloaded at a temperature of 49° F. and passed through the comminutor-vacuumizer unit. The mix was unloaded from this unit and passed through a Mincemaster. Temperature of the mix from the comminutor-vacuumizer was 59° F. Temperature of finished emulsion from the Mincemaster was 67° F.

The finished emulsion was then stuffed and processed in a conventional manner.

Separate samples of the mix from the chopper and comminutor-vacuumizer and finished emulsion sample from the Mincemaster were subjected to an emulsion stability test. The results of this test were as follows:

| Sample from— | Amount of fat released, ml. |
|---|---|
| Chopper (1) | 9.5 |
| Comvac (1) | 9.3 |
| Comvac (2) | 9.3 |
| Mincemaster (1) | .9 |
| Mincemaster (2) | .9 |

Fat content of the finished product was 37.0 percent.

While the final product exceeded the test results described in Example I, the foregoing illustrates the marked improvement of the product by using the Mincemaster following the Comvac operation.

Example III

This test illustrates a case where the use of a Mincemaster is not included in the emulsion preparation procedure.

Meat formula for this test consisted of the following:

| | Lbs. |
|---|---|
| Lean picnic trimmings—fresh | 37 |
| Boneless beef plates—fresh | 145 |
| Beef hearts—fresh | 30 |
| Belly strips—fresh | 38 |
| | 250 |

Other ingredients consisted of all meat bologna flavorings, salt, cure, sodium erythorbate and water.

Emulsion preparation procedure was as follows:

Formula ingredients (except 40 percent of water in the form of ice) were chopped in a chopper to 55° F. The remaining ice was added to the mix and the mix was unloaded from the chopper at 41° F. and passed through the comminutor-vacuumizer unit and transferred to a stuffer. The stuffed product was then processed in a conventional manner.

Separate samples from the chopper and comminutor-vacuumizer were subjected to a stability test. The results of these tests were as follows:

| Sample from— | Amount of fat released, ml. |
|---|---|
| Chopper (1) | 5.5 |
| Chopper (2) | 5.2 |
| Comvac (1) | 1.8 |
| Comvac (2) | 1.8 |

Fat content of the finished product was 32.8 percent.

The above test shows that the product obtained from the Comvac alone was unsatisfactory.

Example IV

Meat formula for this test consisted of the following:

| | |
|---|---|
| Cow meat—frozen | 100 |
| Boneless beef plates—frozen | 150 |
| Beef cheeks—frozen | 100 |
| Pork jowls—frozen | 150 |
| | 500 |

Other ingredients consisted of all meat frankfurter flavorings, salt, cure, sodium erythorbate and water.

Emulsion preparation procedure was as follows:

All formula ingredients were mixed together and placed in a chopper. Temperature of the mix at this time was 40° F. Following a 2-minute chop, the mix was unloaded at a temperature of 48° F. and passed through the comminutor-vacuumizer unit. The mix was unloaded from this unit and passed through a Mincemaster. Temperature of the mix from the comminutor-vacuumizer was 58° F. Temperature of finished emulsion from the Mincemaster was 66° F.

The finished emulsion was then stuffed, linked, and processed in a conventional manner.

Separate samples of the mix from the chopper and comminutor-vacuumizer and finished emulsion sample from the Mincemaster were subjected to an emulsion stability test. The results of this test were as follows:

| Sample from— | Amount of fat released, ml. |
|---|---|
| Chopper (1) | 5.4 |
| Comvac (1) | .9 |
| Comvac (2) | .8 |
| Mincemaster (1) | .15 |
| Mincemaster (2) | .2 |

While in the foregoing specification we have set out specific procedure in considerable detail for the purpose of illustrating embodiments of the invention, it will be understood that such details may be varied widely by those skilled in the art without departing from the spirit of our invention.

We claim:

1. In a process for forming a heat-stable sausage emulsion in which meat containing protein fibers encased in membranes is mixed with fat, salt and water, the steps of abrading said meat to rupture said membranes and to expose said fibers to the action of said salt for the extraction of salt-soluble protein with the result that said fat is smeared in a continuous phase, and shearing said fat without abrasion to distribute said fat as particles in a discontinuous phase in said mixture, whereby said particles are coated by said extracted protein.

2. The process of claim 1 in which said extraction of salt-soluble protein is carried out under vacuum.

3. A process for forming an emulsion, comprising passing meat containing fat and protein fibers encased in membranes between disks rotating with respect to each other to abrade said membranes and expose said fibers to the action of salt for the extraction of protein while smearing said fat into continuous phase, and passing the resulting mixture through apertures of a plate while moving a knife along the surface of the plate and across the edges of said apertures to cut the fat without abrasion into discontinuous particles within the mixture, whereby said particles are coated by said extracted protein.

References Cited

UNITED STATES PATENTS

| Re. 24,683 | 8/1959 | Schnell | 99—109X |
| 3,095,022 | 6/1963 | Schmook | 146—192 |
| 3,221,788 | 12/1965 | Hughes | 146—182 |

FOREIGN PATENTS

| 980,869 | 1/1965 | Great Britain | 99—109 |

HYMAN LORD, Primary Examiner

U.S. Cl. X.R.

99—108; 146—78, 192